United States Patent
Kawakami et al.

(10) Patent No.: US 8,310,783 B2
(45) Date of Patent: Nov. 13, 2012

(54) MAGNETIC TAPE HEAD WITH LIMITED RANGES OF TAPE WRAP ANGLE AND DISTANCE BETWEEN FIRST AND SECOND EDGES

(75) Inventors: Shinji Kawakami, Osaka (JP); Toshio Kawakita, Osaka (JP); Sadamu Kuse, Osaka (JP)

(73) Assignee: Hitachi Maxell, Ltd., Ibaraki-Shi, Osaka (JP)

( * ) Notice: Subject to any disclaimer, the term of this patent is extended or adjusted under 35 U.S.C. 154(b) by 1106 days.

(21) Appl. No.: 11/972,441

(22) Filed: Jan. 10, 2008

(65) Prior Publication Data

US 2008/0170328 A1  Jul. 17, 2008

(30) Foreign Application Priority Data

Jan. 12, 2007 (JP) ................................ 2007-004969

(51) Int. Cl.
G11B 5/255 (2006.01)
(52) U.S. Cl. ........................................ 360/122; 360/231
(58) Field of Classification Search .................. 360/231, 360/122
See application file for complete search history.

(56) References Cited

U.S. PATENT DOCUMENTS

| | | | |
|---|---|---|---|
| 5,905,613 A | 5/1999 | Biskeborn et al. | |
| 6,118,626 A * | 9/2000 | Muftu et al. | 360/122 |
| 6,122,147 A | 9/2000 | Fahimi et al. | |
| 6,282,055 B1 * | 8/2001 | Lakshmikumaran et al. | 360/122 |
| 6,331,920 B1 * | 12/2001 | Albrecht et al. | 360/63 |
| 6,369,982 B2 * | 4/2002 | Saliba | 360/122 |
| 6,469,867 B2 * | 10/2002 | Saliba | 360/122 |
| 7,414,811 B2 * | 8/2008 | Biskeborn | 360/129 |
| 7,486,479 B2 * | 2/2009 | Nakao et al. | 360/130.21 |
| 7,660,072 B2 * | 2/2010 | Biskeborn et al. | 360/122 |
| 2001/0015870 A1 * | 8/2001 | Saliba | 360/122 |
| 2001/0055180 A1 * | 12/2001 | Saliba | 360/122 |
| 2002/0075594 A1 | 6/2002 | Aoki | |
| 2003/0227715 A1 * | 12/2003 | Rathweg | 360/128 |
| 2004/0228029 A1 | 11/2004 | Saliba | |
| 2008/0049358 A1 * | 2/2008 | Biskeborn et al. | 360/128 |

FOREIGN PATENT DOCUMENTS

| | | |
|---|---|---|
| JP | 61-80608 A | 4/1986 |
| JP | 63-31012 A | 2/1988 |
| JP | 6-6608 A | 1/1993 |
| JP | 2000-207800 A | 7/2000 |
| JP | 2002-183906 A | 6/2002 |
| JP | 2004-342303 A | 12/2004 |
| JP | 2006-127780 A | 5/2006 |

OTHER PUBLICATIONS

Japanese Office Action mailed on Feb. 15, 2011 in corresponding Japanese Patent Application No. 2007-004969.

* cited by examiner

*Primary Examiner* — Julie Anne Watko
(74) *Attorney, Agent, or Firm* — Birch, Stewart, Kolasch & Birch, LLP

(57) ABSTRACT

The present invention provides a magnetic head that can sustain favorable head contact even when magnetic tapes having different thicknesses are used. A magnetic head has a sliding surface coming in contact with a moving magnetic tape. An electromagnetic transducing element is disposed in the sliding surface. First edges are formed at each end of the sliding surface in the direction of movement of the magnetic tape. Second edges are formed in positions extended in the direction of movement of the magnetic tape from each end of the sliding surface and come in contact with the magnetic tape.

2 Claims, 2 Drawing Sheets

MAGNETIC TAPE HEAD WITH LIMITED RANGES OF TAPE WRAP ANGLE AND DISTANCE BETWEEN FIRST AND SECOND EDGES

BACKGROUND OF THE INVENTION

1. Field of the Invention

The present invention relates to a magnetic head for magnetic tapes, and more specifically to a magnetic head for computer tapes which has superior tape-to-head contact stability.

2. Description of Related Art

With a recent dramatic increases in amounts of information, there has been more demand for increases in the density and the capacity of magnetic tapes serving as a data storage medium. Possible methods for increasing the capacity of magnetic tapes are, for example: increasing a tape length per roll by reducing the total thickness of the tape; increasing the recording density in the longitudinal direction of the tape by reducing the recording wavelength; and increasing the recording density in the width direction of the tape by reducing the recording track width (increasing the recording density of the magnetic tape).

Moreover, magnetoresistance effect heads (MR heads) utilizing a magnetoresistance effect element (MR element) having high sensitivity are being used as magnetic heads in order to implement such an increase in the recording density of magnetic tapes. When a further increase in the capacity is to be achieved by making full use of these techniques, a head contact stabilizing technique for maintaining stable high reproduction output by reducing the spacing at the point of contact between the moving magnetic tape and the head is important. In the field of data storage, use of linear recording magnetic tape apparatuses is widespread, and MR heads equipped with a MR element, such as described above, are employed.

FIGS. 3A and 3B show cross sections of examples of a conventional magnetic head (MR head). The magnetic head 11 shown in FIG. 3A and the magnetic head 11 shown in FIG. 3B have different sliding surfaces, i.e., a curved surface or a flat surface, but otherwise have the same configuration. The magnetic head 11 includes a sliding surface 13 that comes in contact with a moving magnetic tape 12. The sliding surface 13 includes an electromagnetic transducing element 14. Edges 15 are formed at each end of the sliding surface 13. The magnetic tape 12 moves while being wrapped around the magnetic head 11 so as to form an angle θ with respect to a tangent to the sliding surface 13.

FIGS. 4A and 4B are diagrams for illustrating head contact of the magnetic head 11 having the configuration shown in FIGS. 3A and 3B. FIG. 4A is a diagram showing how air flows in the vicinity of the magnetic head 11, and FIG. 4B is a graph showing how the air pressure P varies along the direction of movement of the magnetic tape 12.

The magnetic tape 12 is strongly pressed against the sliding surface 13 by tape tension. Thus, the flow of entrained air 16 to the sliding surface 13 is cut off at the edge 15 on the upstream side (left side). Also, the flow of entrained air 17 to the sliding surface 13 is cut off at the edge 15 on the downstream side (right side). As a result, a state of negative pressure is created in the space between the magnetic tape 12 and the sliding surface 13, as shown in FIG. 4B.

Therefore, the magnetic tape 12 moves while being drawn to the sliding surface 13. Consequently, the spacing between the electromagnetic transducing element 14 and the magnetic layer becomes small, thus ensuring head contact.

In order to ensure stable head contact, it is important to control the wrap angle θ within a preferred range according to the modulus of elasticity, the thickness, and the tension during movement of a magnetic tape. For this purpose, there have been proposed, for example, a method of providing guides called "outriggers" on the upstream side and the downstream side of a magnetic head so as to keep the wrap angle constant (U.S. Pat. No. 5,905,613), a method of controlling the dimensions of a groove between an outrigger and a sliding surface (JP 2002-183906A), a method of providing a slot around a sliding surface (JP 2004-342303A), and a method of providing a cavity in a central portion of a sliding surface (JP 2000-207800A).

FIG. 5 shows a cross-sectional view of an example of a configuration in which a magnetic head includes fixed guides (outriggers). In this configuration, fixed guides 18 are added on each side of the magnetic head 11. As a result, the wrap angle θ of a magnetic tape 12 during movement is stably kept constant.

Generally, the ability to read data from the latest three generations of magnetic tapes is standard in data storage drives for use in computers. In this situation, it is required that data on different generations of tapes having different thicknesses (usually, a tape thickness has decreased with each generation) be read correctly using the same drive.

However, in a conventional magnetic head as described above, the head is designed for a specific bending stiffness of the magnetic tape. Thus, head contact varies from generation to generation of magnetic tapes, and it has been difficult to sustain favorable head contact with magnetic tapes of all thicknesses used.

Usually, magnetic heads wear upon contact with a magnetic tape, so that the head contour changes gradually. Continued use of magnetic tapes having the same thickness initially causes the head contour to change such that the magnetic tapes conform to the head and the head contact stability improves, but subsequently results in gradual deterioration in the output.

In particular, when a thick tape is moved across a head worn down by thin tapes, it is difficult for the thick tape to follow the contour worn down by the thin tapes, and thus there is a problem in that head contact becomes poor.

SUMMARY OF THE INVENTION

The present invention has been conceived to solve the conventional problems as described above, and it is an object of the present invention to provide a magnetic head that can sustain favorable head contact even when magnetic tapes having different thicknesses are used.

In order to achieve this object, the magnetic head of the present invention is a magnetic head having a sliding surface coming in contact with a moving magnetic tape, wherein an electromagnetic transducing element is disposed in the sliding surface, the magnetic head including first edges formed at each end of the sliding surface in the direction of movement of the magnetic tape and second edges formed in positions extended in the direction of movement of the magnetic tape from each end of the sliding surface, the second edges coming in contact with the magnetic tape.

DETAILED DESCRIPTION OF THE INVENTION

The magnetic head of the present invention includes second edges in addition to first edges, and thus it is possible to sustain favorable head contact even when magnetic tapes having different thicknesses are used.

In the magnetic head of the present invention, it is preferable that the distance between one of the first edges and its corresponding second edge in the direction of movement of the magnetic tape is not less than 20 μm. This configuration is advantageous in preventing deterioration in the output of a magnetic tape.

Moreover, it is preferable that the distance between one of the first edges and its corresponding second edge in the direction of movement of the magnetic tape is not less than 30 μm and not more than 300 μm. With this configuration, it is possible to ensure that a prevention of deterioration in the output of a magnetic tape can be sustained, while at the same time suppressing weight increase.

Moreover, it is preferable that the angle formed by a straight line connecting one of the first edges to its corresponding second edge and a tangent to the sliding surface at the first edge is not more than 0.4°. This configuration is advantageous in preventing deterioration in the output of a magnetic tape.

Moreover, it is preferable that the angle formed by a straight line connecting one of the first edges to its corresponding second edge and a tangent to the sliding surface at the first edge is not less than 0.1° and not more than 0.4°. This configuration stabilizes head contact even further and is therefore more advantageous in preventing deterioration in the output of a magnetic tape.

Figure 1:
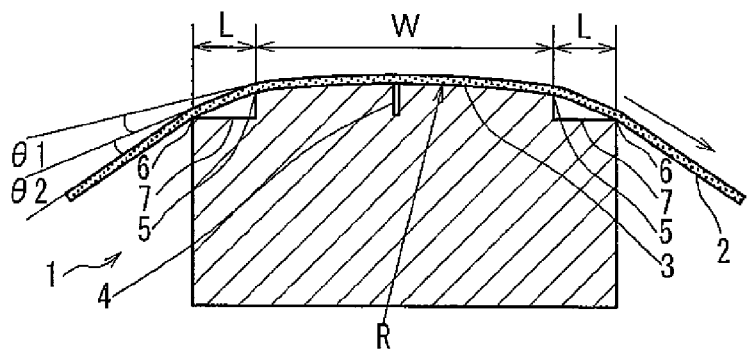
FIG. 1 is a cross-sectional view of a magnetic head according to an embodiment of the present invention.

Hereinafter, an embodiment of the present invention will be described with reference to the drawings. FIG. 1 shows a cross-sectional view of a magnetic head (MR head) according to the embodiment of the present invention. The magnetic head 1 has a sliding surface 3 formed thereon, with which a moving magnetic tape 2 comes in contact. In an example shown in FIG. 1, a curved surface having a radius of curvature R is used as an example of the sliding surface 3. However, the sliding surface 3 may be a flat surface.

The sliding surface 3 includes an electromagnetic transducing element 4. First edges 5 are provided at each end of the sliding surface 3 in the direction of movement of the magnetic tape 2. W represents the distance between the opposite ends of the sliding surface 3 in the direction of movement of the magnetic tape 2. In this embodiment, "edge" refers to a portion at which one surface intersects with another surface and by which a ridgeline is formed.

The magnetic head 1 is provided with extensions 7. The extensions 7 are portions extended from each end of the sliding surface 3 in the direction of movement of the magnetic tape 2. In the example shown in FIG. 1, the extensions 7 are formed integrally with the magnetic head 1. However, it is also possible to attach separate members to the magnetic head 1. Each of the extensions 7 has a second edge 6 formed therein. L represents the length the extensions 7 are extended.

As shown in FIG. 1, the magnetic head 1, when viewed along the direction of movement of the magnetic tape 2, includes a section where the sliding surface 3 is formed and sections where the extensions 7 are formed, and the sum of the distance W and the length 2L gives the width of the magnetic head 1 as a whole. This means that the magnetic head 1 is constructed as also including the extensions 7.

The extensions 7 are formed separately from the sliding surface 3. Thus, the extensions 7 have no planar sliding surface formed thereon. That is to say, the magnetic tape 2 is in line contact with the second edges 6, and there are spaces on both the upstream and downstream sides of the magnetic tape 2 with respect to the second edges 6.

Figure 4A:
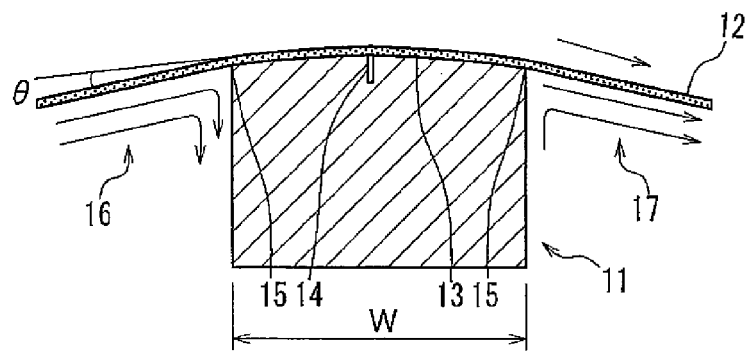
FIG. 4 is a diagram for illustrating head contact of a MR head.
Figure 4B:
Figure 5:
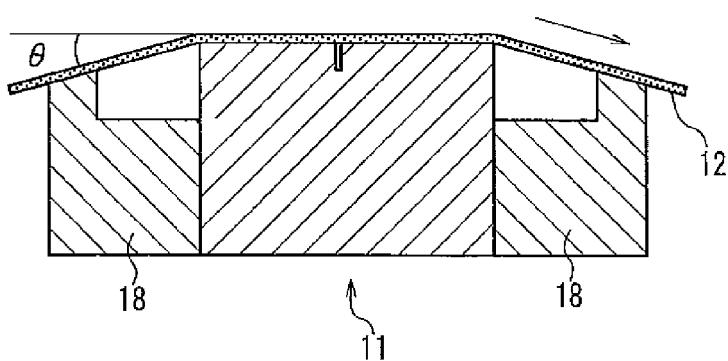
FIG. 5 is a cross-sectional view of an example of a conventional configuration in which a magnetic head includes fixed guides.

As described above, the magnetic head 1 shown in FIG. 1 has the first edges 5 formed at each end of the sliding surface 3. Since the first edges 5 are provided, entrained air 16 and entrained air 17 (see FIG. 4) caused by movement of the magnetic tape 2 are cut off to ensure the state of negative pressure in the space between the magnetic tape 2 and the sliding surface 3, and thus favorable head contact is ensured.

The magnetic head 1 according to this embodiment includes the second edges 6 in addition to the first edges 5. By bringing the magnetic tape 2 into contact with the second edges 6, entrained air caused by movement of the magnetic tape 2 can be cut off, as is the case with the first edges 5. Therefore, the second edges 6 also contribute to improvement of the stability of head contact with the magnetic tape 2.

The second edges 6 are provided in the extensions 7 that are separate from the sliding surface 3. Therefore, the magnetic tape 2 can be brought into contact with two types of edges, i.e., the first edges 5 and the second edges 6. This means that the contact force between the magnetic tape 2 and the edges can be distributed between the two types of edges, and thus the amount of wear of each edge can be reduced. As a result, head contact can be sustained in favorable condition for a Tong period of time.

Furthermore, by appropriately setting the tape tension of the magnetic tape 2 and the shapes of the two types of edges, it is possible to control the strengths of the contact forces when the magnetic tape 2 comes in contact with the two types of edges in accordance with the tape stiffness of the magnetic tape 2. For example, it is possible to make a setting that will bring a thin tape into firm contact with the second edges 6 and a thick tape into firm contact with the first edges 5. With this setting, favorable head contact can be achieved even when a thick tape is moved across a head contour that has been worn down by movement of a thin tape.

The second edges 6 also can provide a function of maintaining the wrap angle of the magnetic tape 2 at the first edges 5 constant, and therefore contribute also to improvement of the stability of head contact.

Figure 2:
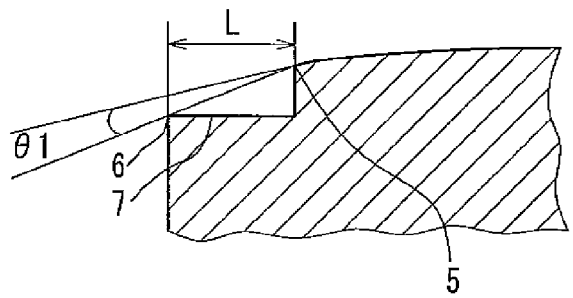
FIG. 2 is an enlarged view of a relevant part of the magnetic head shown in FIG. 1.

FIG. 2 shows an enlarged view of the edge portions shown in FIG. 1. In FIG. 2, $\theta 1$ represents an angle formed by a straight line connecting the first edge 5 to the second edge 6 and a tangent to the sliding surface 3 at the first edge 5. If the angle is set to $\theta 1$, then, as shown in FIG. 1, the magnetic tape 2 moves while being wrapped around the magnetic head 1 so as to form, between the first edge 5 and the second edge 6, an angle $\theta 1$ with respect to the tangent to the sliding surface 3 at the first edge 5.

Moreover, the magnetic tape 2 can be tilted even further relative to the second edges 6 using guides that are separate from the magnetic head 1. In the example shown in FIG. 1, the magnetic tape 2 tilted at an angle $\theta 1$ between the respective first edges 5 and the respective second edges 6 is added with a further tilt of an angle $\theta 2$.

The angle θ1 and the extending length L of the extensions 7 are set as appropriate according to the modulus of elasticity, the thickness, and the tension during movement of a magnetic tape. Preferred numerical examples will be described later with reference to examples. The edges are preferably formed to be symmetric with respect to the central axis of the head.

Hereinafter, this embodiment will be described more specifically with reference to the examples.

Table 1 below shows Examples 1 to 6, and Table 2 shows Examples 7 to 11 and Comparative Example 1.

TABLE 1

| | Item | Ex. 1 | Ex. 2 | Ex. 3 | Ex. 4 | Ex. 5 | Ex. 6 |
|---|---|---|---|---|---|---|---|
| | L (μm) | 20 | 30 | 35 | 35 | 35 | 35 |
| | θ (°) | — | — | — | — | — | — |
| | θ1 (°) | 0.3 | 0.3 | 0.1 | 0.3 | 0.3 | 0.4 |
| | θ2 (°) | 0.9 | 0.9 | 0.9 | 0.9 | 0.9 | 0.9 |
| | R (mm) | 4.5 | 4.5 | 4.5 | 4.5 | Flat | 4.5 |
| | W (μm) | 210 | 210 | 210 | 210 | 210 | 210 |
| Initial output | 7 μm tape (dB) | 0 | 0 | 0.1 | 0.1 | 0 | 0 |
| | 9 μm tape (dB) | 0 | 0 | 0.1 | 0.1 | 0.1 | 0 |
| Output after 1500 hours of movement | 7 μm tape (dB) | −0.3 | −0.4 | −0.2 | −0.3 | −0.4 | −0.4 |
| | 9 μm tape (dB) | −3.2 | −2.8 | −2.2 | −2.7 | −2.1 | −2.9 |
| Δ Tape thickness compatibility value (dB) | | 2.9 | 2.4 | 2.0 | 2.4 | 1.8 | 2.5 |

TABLE 2

| | Item | Ex. 7 | Ex. 8 | Ex. 9 | Ex. 10 | Ex. 11 | Com. Ex. 1 |
|---|---|---|---|---|---|---|---|
| | L (μm) | 35 | 50 | 100 | 200 | 300 | — |
| | θ (°) | — | — | — | — | — | 1.2 |
| | θ1 (°) | 0.5 | 0.3 | 0.3 | 0.3 | 0.3 | — |
| | θ2 (°) | 0.9 | 0.9 | 0.9 | 0.9 | 0.9 | — |
| | R (mm) | 4.5 | 4.5 | 4.5 | 4.5 | 4.5 | 4.5 |
| | W (μm) | 210 | 210 | 210 | 210 | 210 | 210 |
| Initial output | 7 μm tape (dB) | 0 | 0.4 | 0.4 | 0.5 | 0.1 | 0 |
| | 9 μm tape (dB) | 0 | 0.4 | 0.4 | 0.4 | 0.1 | 0 |
| Output after 1500 hours of movement | 7 μm tape (dB) | −0.3 | 0 | 0 | 0 | −0.3 | −0.5 |
| | 9 μm tape (dB) | −3.3 | −2.4 | −2.3 | −2.1 | −2.0 | −3.9 |
| Δ Tape thickness compatibility value (dB) | | 3.0 | 2.4 | 2.3 | 2.0 | 1.7 | 3.4 |

Figure 3A:
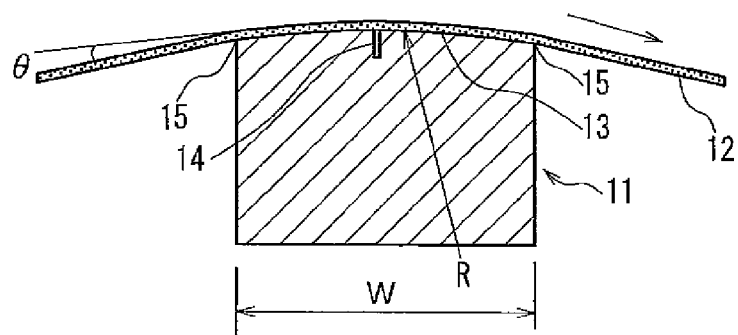
FIG. 3A is a cross-sectional view according to an example of a conventional magnetic head.
Figure 3B:
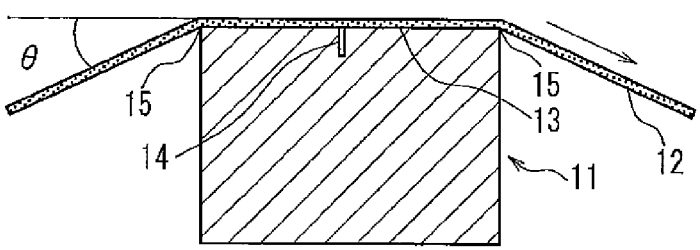
FIG. 3B is a cross-sectional view according to another example of a conventional magnetic head.

Examples 1 to 11 (denoted as Ex. 1 to Ex. 11 in the above tables) are examples in which a MR head having the configuration shown in FIG. 1 was used and L, θ1, R, and W thereof were determined. In Comparative Example 1 (denoted as Com. Ex. 1 in the above table), a magnetic head 11 having the configuration shown in FIG. 3A was used, and θ, R, and W thereof were determined.

Regarding the magnetic tapes used for output evaluation, magnetic tapes for computers having a Young's modulus of 8.2 GPa in the longitudinal direction were used, where the magnetic tapes had two different thicknesses, i.e., 7 μm or 9 μm. Twelve rolls (twelve rolls in total, one each for Examples 1 to 11 and Comparative Example 1) each of the magnetic tapes having respective thicknesses were prepared, and signals at 15 MH were written in and reproduced from the magnetic tapes moving at 4.5 m/s at a tension of 0.7 N. The output obtained at this time was taken as the initial output.

The initial output of the 7 μm thick magnetic tapes was calculated by conversion using the output of the 7 μm thick magnetic tape measured with the head of Comparative Example 1 as the reference (0 dB). Similarly, the initial output of the 9 μm thick magnetic tapes was calculated by conversion using the output of the 9 μm thick magnetic tape measured with the head of Comparative Example 1 as the reference (0 dB).

Next, output after movement was obtained. Specifically, first, the 7 μm thick magnetic tapes were respectively moved across the heads of Examples and Comparative Example 1 at 4.5 m/s at a tension of 0.7 N for 1500 hours, to cause the heads to wear down and accordingly change the contours. After this, reproduction from the 7 μm thick and 9 μm thick magnetic tapes with the heads of Examples and Comparative Example 1 was carried out again to obtain output. The output obtained at this time was taken as the output after movement.

As described above, when a magnetic tape having a thickness of 7 μm is moved across a magnetic head for 1500 hours, the magnetic head changes its contour into a worn-down contour which conforms to the magnetic tape having a thickness of 7 μm. Reproduction from the 9 μm thick magnetic tapes was carried out with the heads being in this state, and the resultant degrees of output deterioration were compared with those of the initial state to obtain the differences, which were used to measure the sustainability of the tape thickness compatibility of the heads. More specifically, ((initial output of 9 μm-tape initial output of 7 μm tape)−(output after movement of 9 μm tape−output after movement of 7 μm)) was taken as the tape thickness compatibility value Δ and used to measure the sustainability of the tape thickness compatibility of the heads. This value is given in the bottom row of Tables 1 and 2.

As is evident from Tables 1 and 2, the tape thickness compatibility value Δ of the magnetic head of Comparative Example 1 (Table 2) is 3.4 dB, whereas the tape thickness compatibility values Δ of Examples 1 to 11 are all not more than 3.0 dB, i.e., the deterioration in reproduction output due to the change in tape thickness is small and stable.

It can be considered that this is because, since the second edges are provided, the change in spacing due to the change in tape thickness of the magnetic heads according to Examples 1 to 11 is small when compared with that of the magnetic head according to Comparative Example 1.

More particularly, in Examples 1, 2, 4, and 8 to 11, L increases in that order while the other conditions are the same. In these examples, the tape thickness compatibility value Δ given in the bottom row of the tables decreases, or remains the same value, as L increases. In particular, when L increases by a large amount, the tape thickness compatibility value Δ also decreases by a large amount. From the foregoing, it can be considered that the greater the value of L, the more preferable this value becomes in view of the suppression of output deterioration. Therefore, it can be considered from the results shown in Tables 1 and 2 that L is preferably not less than 20 μm.

On the other hand, a value of L smaller than 30 μm will cause the second edges to be lost more quickly due to head wear. In this case, such a value is disadvantageous in view of the sustainability of the effect. Moreover, a value of L greater than 300 μm will cause an increase in the shape of the head as a whole, resulting in an increase in weight. In this case, such a value is disadvantageous in view of the servo tracking characteristics of a head actuator. Therefore, with consideration given not only to the prevention of output deterioration but also to the sustainability of the effect and the weight increase, it can be considered that L is more preferably not less than 30 μm and not more than 300 μm.

Next, in Examples 3, 4, 6, and 7, the angle θ1 increases in that order while the other conditions are the same. In these examples, the tape thickness compatibility value Δ increases as the angle θ1 increases. The results shown in Tables 1 and 2 indicate that the tape thickness compatibility value Δ is smaller than that of Comparative Example 1 as long as the angle θ1 is not more than 0.5°.

On the other hand, a value of θ1 greater than 0.4° will cause a large deformation of the tapes at the first edges, so that the change in the contact force due to different tape thicknesses becomes large. In this case, spacing fluctuations become large, and thus head contact is more likely to be unstable. Therefore, θ1 is preferably not more than 0.4°.

Moreover, a value of θ1 smaller than 0.1° will cause too small a contact force at the first edges, so that the effect of eliminating air entrained by the tapes becomes insufficient, which may result in an increase in the spacing. Therefore, with consideration also given to the stability of head contact, it can be considered that θ1 is more preferably not less than 0.1° and not more than 0.4°.

In the foregoing examples, the width W was set to 210 μm. However, the width can be determined as appropriate, for example, within a range of not less than 100 μm and not more than 600 μm. Moreover, in the foregoing examples, the angle θ2 was set to 0.9°. However, this angle can be determined as appropriate, for example, within a range of not less than 0.5° and not more than 2.0°.

Furthermore, the magnetic head 1 described above had two types of edges, i.e., the first edges 5 and the second edges 6, on each side. However, the number of types of edges on each side of the magnetic head 1 may be three or more. Also, in cases where three or more types of edges are provided, it is preferable to provide the plurality of types of edges in accordance with the above-described values of L and θ1. More specifically, when three or more types of edges are provided, the edges can be configured such that, on each side, the above-described preferred range of the angle θ1 holds true between the first edge and all other second edges and the length L holds true between the first edge and the outermost second edge.

As described above, according to the present invention, it is possible to sustain favorable head contact even when magnetic tapes having different thicknesses are used, and the present invention is therefore useful, for example, as a magnetic head for computer tapes.

The invention may be embodied in other forms without departing from the spirit or essential characteristics thereof. The embodiment disclosed in this application is to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A magnetic head having a sliding surface coming in contact with a moving magnetic tape, wherein an electromagnetic transducing element is disposed in the sliding surface, the magnetic head comprising:

first edges formed at each end of the sliding surface in the direction of movement of the magnetic tape;

second edges formed in positions extended in the direction of movement of the magnetic tape from each end of the sliding surface, the second edges coming in contact with the magnetic tape;

wherein an angle formed by a straight line connecting one of the first edges to a corresponding one of the second edges and a tangent to the sliding surface at the first edge is not less than 0.1° and not more than 0.4°; and wherein the distance between one of the first edges and a corresponding one of the second edges in the direction of movement of the magnetic tape is not less than 30 μm and not more than 300 μm.

2. The magnetic head according to claim 1, wherein the distance between one of the first edges and a corresponding one of the second edges in the direction of movement of the magnetic tape is not less than 20 μm.

\* \* \* \* \*